(12) United States Patent
de Heer

(10) Patent No.: US 7,693,144 B2
(45) Date of Patent: Apr. 6, 2010

(54) METHOD OF PROVIDING VPLS SERVICE IN A BRIDGED (E.G. 802.1D) NETWORK OF A SERVICE PROVIDER

(75) Inventor: Arie Johannes de Heer, Hengelo (NL)

(73) Assignee: Alcatel-Lucent USA Inc., Murray Hill, NJ (US)

(*) Notice: Subject to any disclaimer, the term of this patent is extended or adjusted under 35 U.S.C. 154(b) by 791 days.

(21) Appl. No.: 11/096,219

(22) Filed: Mar. 31, 2005

(65) Prior Publication Data

US 2006/0221950 A1    Oct. 5, 2006

(51) Int. Cl.
*H04L 12/28* (2006.01)
*H04L 12/56* (2006.01)

(52) U.S. Cl. .................. 370/389; 370/397; 370/399

(58) Field of Classification Search ......... 370/229–230, 370/230.1, 231, 322, 233–236, 236.1–236.2, 370/237, 238, 238.1, 239–240, 395.53, 911
See application file for complete search history.

(56) References Cited

U.S. PATENT DOCUMENTS 7,152,115 B2 * 12/2006 Ould Brahim et al. ...... 709/238

7,298,705 B2 * 11/2007 Shankar et al. ............. 370/249

OTHER PUBLICATIONS

LAN/MAN Standards Committee, "Part 3: Media Access Control (MAC) Bridges", 1998, IEEE, all pages.*
LAN/MAN Standards Committee, "Virtual Bridged Local Area Networks", Dec. 8, 1998, IEEE, all pages.*

* cited by examiner

*Primary Examiner*—Kwang B Yao
*Assistant Examiner*—Adam Duda
(74) *Attorney, Agent, or Firm*—Wall & Tong, LLP

(57) ABSTRACT

A method for providing VPLS service in a bridged (e.g. 802.1D) network of a service provider includes configuring the bridged network. Each ingress port of a bridging network element is assigned a port VLAN ID (PVID). The ingress ports are further configured to associate their respective PVID with data frames entering such ingress ports. Further, each VLAN ID is assigned a group membership where a frame is forwarded from an ingress port only to those ports that share group membership with this ingress port.

7 Claims, 4 Drawing Sheets

METHOD OF PROVIDING VPLS SERVICE IN A BRIDGED (E.G. 802.1D) NETWORK OF A SERVICE PROVIDER

FIELD OF THE INVENTION

Embodiments of the present invention relate to networks capable of providing Ethernet services and, in particular, to a method and system of using an Ethernet bridge network to implement an IETF VPLS solution.

BACKGROUND OF THE INVENTION

Network operators are becoming more and more interested in offering Ethernet services, such as Ethernet Private Line services. They offer transparent transfer of Ethernet frames in point-to-point Ethernet connections. Ethernet LAN services are becoming popular as well. They offer multipoint-to-multipoint services.

In general, a network architecture 100 for offering these Ethernet services is shown in FIG. 1. The Ethernet providers network 102 is shown as a cloud with some edge bridges 104 having network ports 105. Customer LANs 106 having customer ports 107 are connected to the network ports 105 of the edge bridges 104.

Frames from customer LANs 106 entering the Ethernet providers network 102 via an edge bridge 104 are classified into a single Service Instance (either a line or a LAN service). Frames belonging to a certain Service Instances may only leave the network via edge bridge ports 105 that are connected to the customer LANs' port 107 of that Service Instance.

The provider can choose between at least the following two methods to provide the Ethernet services: 1) using an IEEE 802.1 bridged network, or 2) using an IETF VPLS network. There are several other techniques that provide this service. Embodiments of the present invention are described herein using only the above two methods but it should be understood that the present invention is not limited to these two techniques.

In the IEEE 802.1 bridged network case, as shown in a network architecture 200 of FIG. 2, the providers network 202 is a bridged LAN as defined in the appropriate IEEE 802 standards (IEEE 802.1D-2004, IEEE 802.1Q-2003, IEEE 802.1 ad-draft 1-4), incorporated by reference herein in their entirety. The active topology is limited to form a spanning tree. All nodes are connected, but between every pair of nodes, there is just one path possible. That is, the topology is loop-free. If there are the potential for loops, ports or links are blocked or removed.

For example, a packet may go from edge bridge $204_C$ to edge bridge $204_B$ via internal bridge $204_D$ to edge bridge $204_A$ and then to edge bridge $204_B$. But the packet may never go from edge bridge $204_A$ to edge bridge $204_C$ via edge bridge $204_B$ because port 208 of the internal bridge $204_D$ is blocked. Only the direct transfer from edge bridge $204_A$ to edge bridge $204_B$ is allowed according to IEEE 802 standards and protocols.

This path may cross other edge bridges, i.e., these edge bridges forward frames based on the Ethernet MAC addresses and VLAN ID. VLAN ID's are used to separate frames belonging to different Service Instances. For example, the path between edge bridge $204_C$ and edge bridge $204_B$ contains edge bridge $204_A$ and internal bridge $204_D$. Therefore, all frames from edge bridge $204_C$ to edge bridge $204_B$, and vice versa, are switched by all edge bridges $204_A$, $204_B$, $204_C$ and internal bridge $204_D$.

Several disadvantages exist with the IEEE 802.1 technique. One is to loose certain paths because of some disabled links. Another is the complexity of the protocol used to achieve this configuration. Finally, there may be a slow recovery time of the protocol.

In the IETF VPLS network case, on the other hand, as shown in FIG. 3, there are only edge bridges $304_A$, $304_B$ and $304_C$, with no internal bridge $304_D$. Every edge bridge has a direct connection to every other edge bridge, i.e., only the edge bridges forward frames based on the Ethernet MAC address. There may be nodes between the edge bridges, but there is no need to switch based on MAC address in these nodes. MPLS labels are used to separate frames belonging to different Service Instances on the links between the edge bridges. If there is a call for an IP packet from $304_A$ to $304_C$, it will never go via $304_B$. Only the direct transfer between two edges is allowed under this protocol. An IP packet to go from $304_A$ to $304_B$ to $304_C$ is not allowed.

The main difference between the two approaches discussed above and shown in FIG. 2 and FIG. 3 is that the IETF VPLS network approach has a direct link between every pair of edge bridges and in this approach only the edge bridge forwards based on the Ethernet MAC address.

Both methods have advantages and disadvantages. The IEEE 802.1 bridge LAN method is very efficient if there is a lot of multicast traffic within a Service Instance because only one copy of the multicast frame has to be sent over the spanning tree, whereas, in the IETF VPLS network scenario, this frame has to be replicated and sent separately for each destination.

The IETF VPLS network method allows for efficient traffic engineering. Every edge bridge is directly connected to every other edge bridge in the network. Edge bridges can only forward inside the network to customer or from customer toward an edge bridge. But, they never forward or receive from one edge bridge to another edge bridge. If a customer desires a multipoint service and knows the traffic matrix between the endpoints, the operator can easily configure the required amount of capacity between each endpoint, and force the customer not to exceed this amount. In an IEEE 802.1 bridged LAN network, in general, this is not possible.

Thus, both methods, i.e., IEEE 802.1 bridged LAN and IETF VPLS network, have their own advantages. Heretofore, however, it was not possible to apply the IETF VPLS method using hardware developed for IEEE 802.1 bridged LAN network compliant bridges.

Thus, there is a need in the art for a method to configure an existing compliant bridge network so it can behave according to the IETF VPLS network.

SUMMARY

Various deficiencies of the prior art are addressed by the present invention of method and system for VPLS bridge using IEEE802.1 hardware.

In accordance with an embodiment of the present invention, there is provided a method for implementing Ethernet service, comprising configuring a bridged network to support virtual private LAN services (VPLS).

In accordance with another embodiment of the present invention, there is provided a method, comprising receiving a frame at a customer port; learning the address of the frame and associating the address with the customer port; and tagging the frame with a PVID value.

In accordance with yet another embodiment of the present invention, there is provided a network for supplying Ethernet services using VPLS, comprising: linked bridges; and customer ports associated with respective bridges and coupled to respective customer LANs.

In accordance with a further embodiment of the present invention, there is provided a system for implementing Ethernet service, comprising means for configuring a bridged network to support virtual private LAN services (VPLS); means for receiving a frame at a customer port; means for learning the address of the frame and associating the address with the customer port; and means for tagging the frame with a PVID value.

BRIEF DESCRIPTION OF THE DRAWINGS

The teachings of the present invention can be readily understood by considering the following detailed description in conjunction with the accompanying drawings, in which.

To facilitate understanding, identical or similar reference numerals have been used, where possible, to designate identical elements that are common to the figures.

DETAILED DESCRIPTION OF THE INVENTION

Embodiments of the present invention are primarily described within the context of an IEEE 802.1 bridged LAN and IETF VPLS networks; however, those skilled in the art and informed by the teachings herein will realize the present invention is also applicable to any combination of the advantages of any service providers networks and methods capable of providing Ethernet services.

Embodiments of the present invention combine in a unique way the advantages of both network architecture and protocol. For example, in the IEEE bridge approach, there are links between every pair of edge bridges, and capacity can be assigned. In the VPLS approach, the amount of traffic between any two nodes could conceivably consume capacity to the link in those two nodes. If one knows the amount of traffic going from, for example a node C to a node B, one can assign this capacity to that link. And that capacity can be given to all the frames that come from node B and only for those frames.

In the bridge approach for the capacity from a bridge C to a bridge B, one has to assign capacity from bridge C to bridge D, bridge D to bridge A, and from bridge A to bridge B. But this capacity is also used for frames going from bridge A to bridge B only or from any other nodes within that network. So that leads to much more shared resources.

Figure 1:
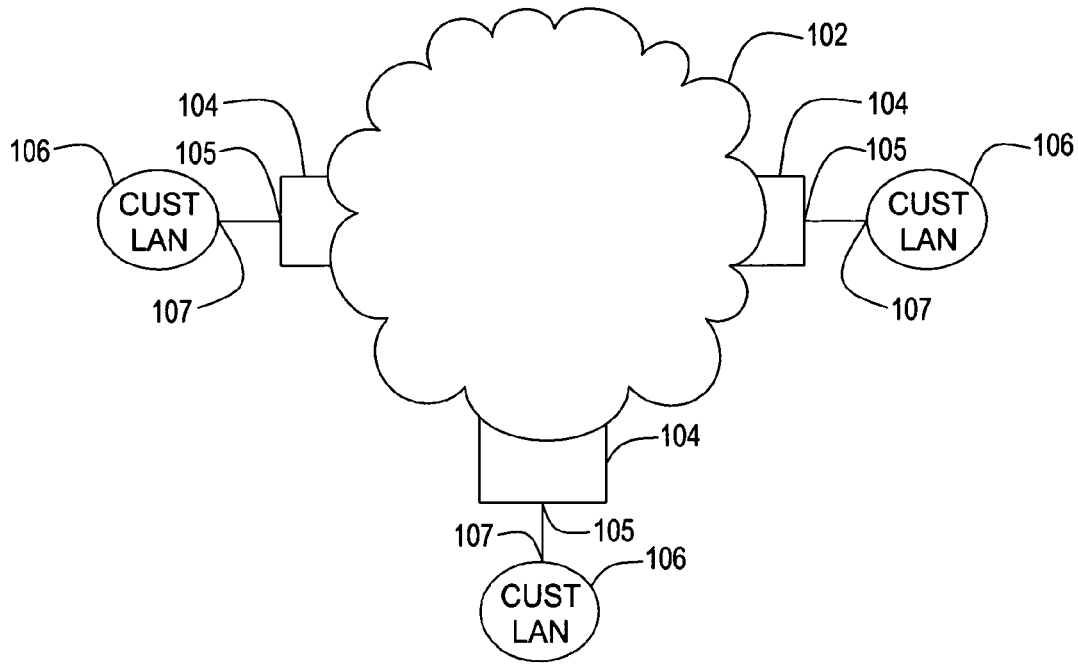
FIG. 1 depicts a schematic diagram of a general service providers network architecture.
Figure 2:
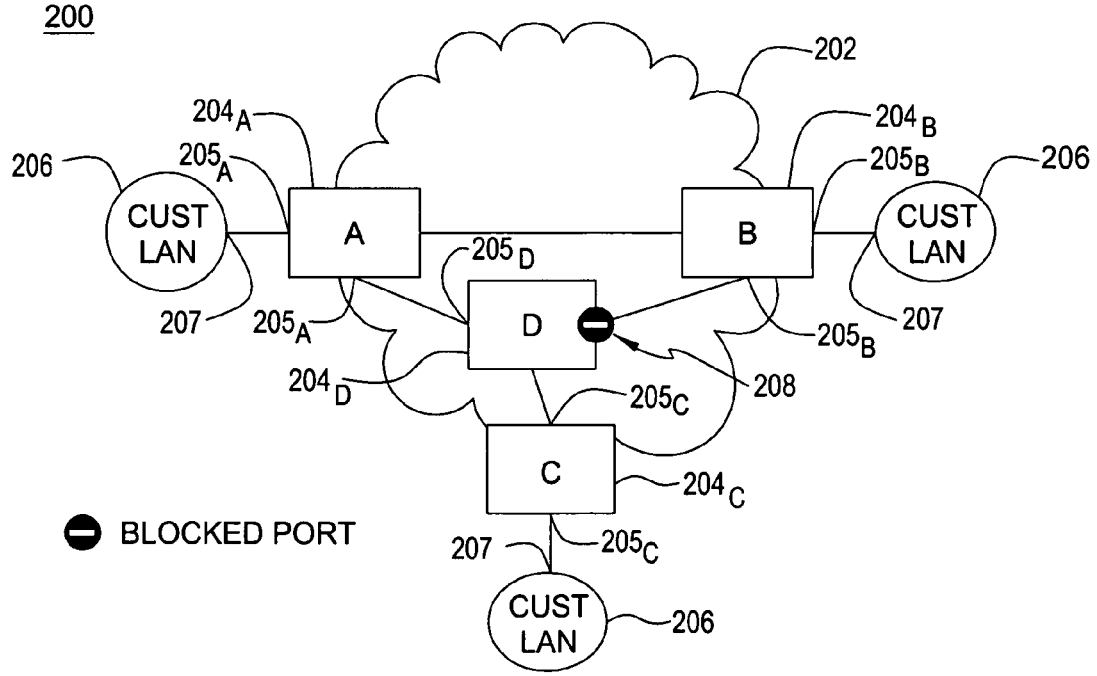
FIG. 2 depicts a schematic diagram of a bridged network architecture.
Figure 3:
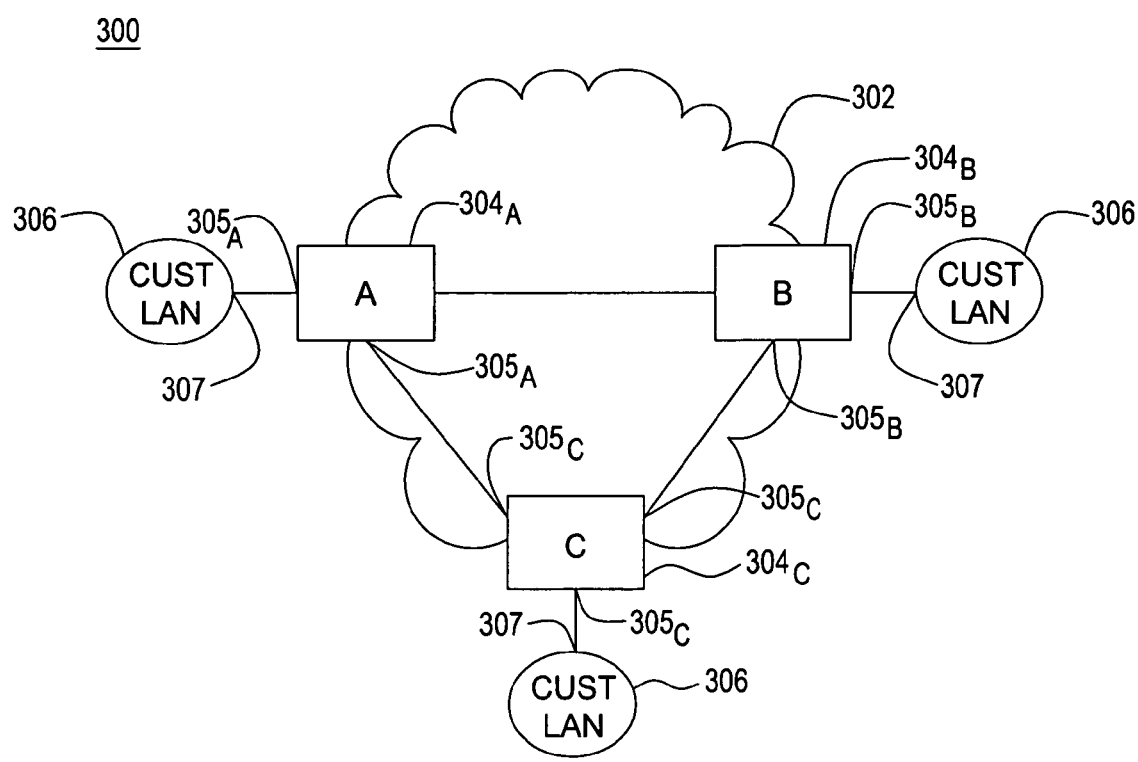
FIG. 3 depicts a schematic diagram of an IETF VPLS network architecture.
Figure 4:
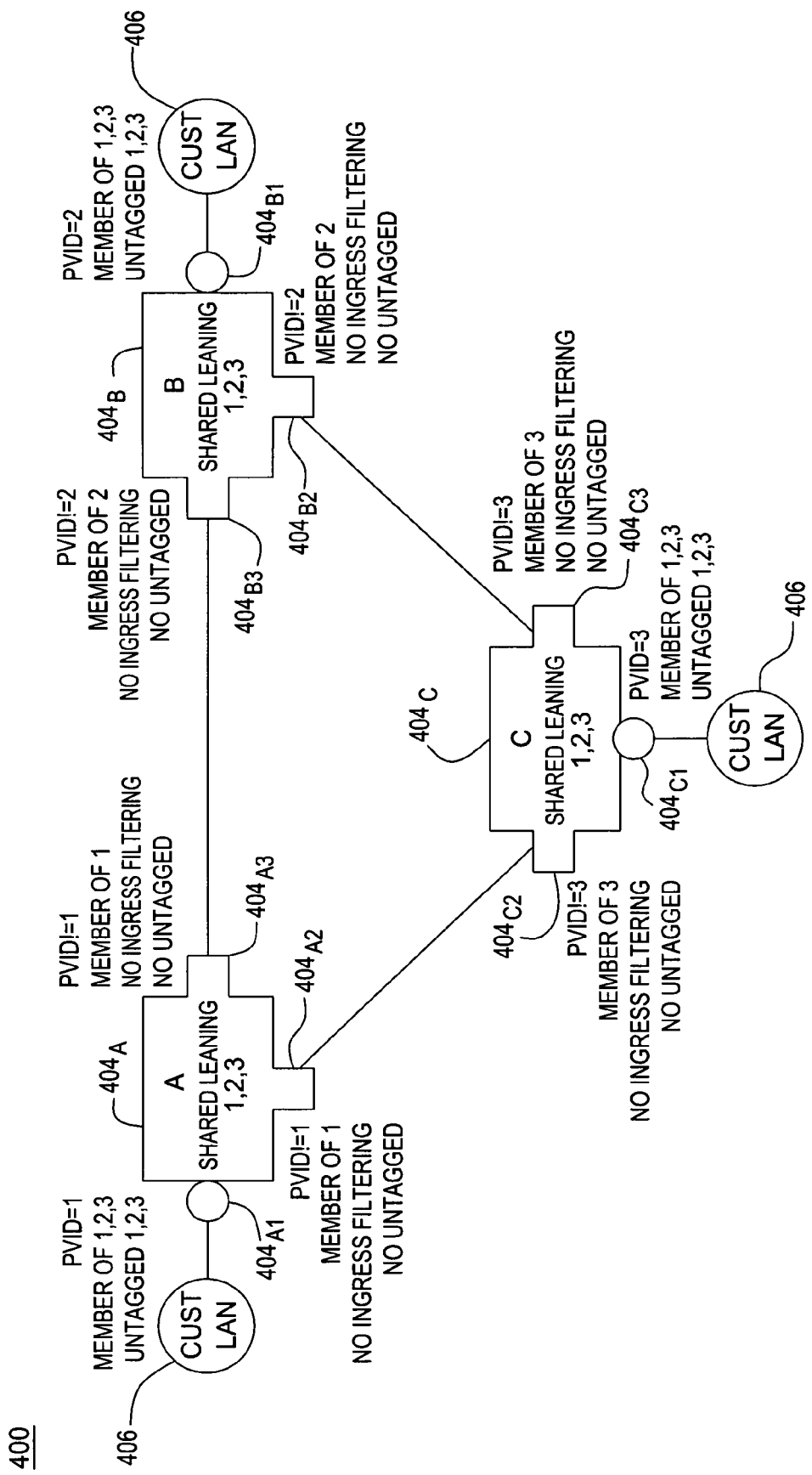
FIG. 4 depicts a schematic diagram of a bridged network architecture configured to support an IETF VPLS method for implementing Ethernet services in accordance with an embodiment of the present invention.

In FIG. 4, network architecture 400 depicts an embodiment of the present invention, which is an IEEE 802.1 Ethernet bridge networked configured to support an IETF VPLS method for implementing Ethernet services. FIG. 4 shows three edge bridges $404_A$, $404_B$ and $404_C$. A customer may desire a LAN service interconnecting its customer LANs 406 to these provider edge bridges. For each bridge there are two types of ports: network ports (e.g., $404_{A2, B2, C2}$ and $404_{A3, B3, C3}$) and customer ports (e.g., $404_{A1, B1, C1}$). Customer ports are connected to the customer LANs 406. Network ports are connected to other bridges in the network. FIG. 4 shows a direct connection between each pair of edge bridges. The connection can be realized using any suitable technology, e.g. MPLS, SDH, or even (Bridged) Ethernet.

According to this embodiment, the edge nodes or bridges and the frames received on the LAN side are only forwarded to the customer and vice-versa. The network frame received on the LAN side is forwarded to another link on the LAN side. In order to achieve this, like the Ethernet bridge hardware, special settings in the bridges need to be applied.

The IEEE 802.1 bridges support the concept of virtual LANs (VLANs). A VLAN identifier (VLAN ID) is added to each packet. This VLAN ID identifies the customer. So, if multiple customers are sharing the same network, then each customer is using a different VLAN ID on the Ethernet packet and the port connected to customer are configured such that all frames going out for that customer are frames with that VLAN ID and not the other VLAN ID going to other customers.

For example, the customer generates an untagged frame so there is no VLAN ID assigned to it. Then, at the edge bridge, when the traffic enters, the network assigns a VLAN ID identifying that particular customer. When the frame leaves the network again, the VLAN ID is removed. Stated another way, the provider adds a tag to every frame upon entrance or ingress to the network and removes the tag when the packet leaves or egresses the network again. That tag uniquely identifies the service customer. This technique is used in bridging networks when several customers share the same infrastructure.

Embodiments of the present invention utilize the aforementioned technique in a different and unique manner. The network needs to provide for a certain customer a link between $404_A$ and $404_C$, $404_A$ and $404_B$, and $404_C$ and $404_B$. At the customer ports and entrance ports are the ports connecting the customer locations A and B and C. Normally, the same VLAN ID is assigned for that customer. That is logical because all those sides belong to the same customer so traffic from one side should be allowed to go to the other side.

When a VPLS approach is used, this is no longer true in the sense that traffic from the customer node originating from location C might be forwarded to locations A and B, but then it should stop. It should not again be forwarded from A to B or from B to A because of duplication, loops and the like. But in the normal bridge, this is allowed.

In accordance with embodiments of the present invention, the way to achieve this is to assign a different VLAN ID at every ingress port. At location $404_A$, for example, the customer's frames get the VLAN ID of 1. This is called the port VLAN ID (PVID). Thus, for location $404_A$, PVID=1. For location $404_B$, it receives PVID=2 and for location $404_C$, it receives PVID=3.

Thus, all frames entering at that port in the network get this PVID assigned to them. If a frame has a certain PVID, it may be forwarded to ports that are a member of that PVID. With every port, there is provided a "member of:" designation and then the number or the sub number. This indicates the membership of that particular VLAN. So, for example, at bridge $404_A$ the customer is a member of VLAN 1, 2, and 3 at port $404_{A1}$, but at the other two ports, $404_{A2, A3}$, the customer is only a member of 1. So, this means that the other two ports will only forward frames from VLAN 1 onto those links.

Belonging to VLAN ID 1 or having the packet of VLAN ID 1 is necessary to get onto those links.

Likewise, for 404$_B$ and 404$_C$, it is the same configuration, but VLAN ID 2 and 3, respectively. So, node 404$_B$ will only forward frames with VLAN ID 2 on the network links and node 404$_C$ will only forward frames with VLAN ID 3 on the network links. Thus, if a frame is sent by the customer at site 404$_A$, it will be assigned VLAN ID 1. Because the other ports are also a member of VLAN ID 1, the frame may be forwarded to both 404$_B$ and 404$_C$. Whether it is forwarded to 404$_B$ or 404$_C$ or both depends on the contents of the forwarding database (address table). If there is an entry for the destination address, it will be 404$_B$ or 404$_C$ depending on the entry. If there is no such entry, it will be 404$_B$ and 404$_C$.

For both 404$_B$ and 404$_C$ ports, they are not a member of 1, but they are members of 2 and 3, respectively. Where, at first glance, it would appear that these ports should not allow the frame, the membership logic only applies to sending frames on the link, not for receiving frames on the link. So, for example, node 404$_B$ is connected to node 404$_A$ but is a member of VLAN ID 2 only. However, this means that 404$_B$ can only send frames from VLAN ID 2 on that link. But it can receive frames with any VLAN ID.

The membership only applies to frames that are being sent and not received. This is called no ingress filtering in FIG. 4. If there is ingress filtering, for example, the ports connected with the customer, then the membership both applies to sending and receiving. That means that on the customer facing ports, the user can send and receive frames, which can be sent and received using both VLAN IDs. Because VLAN ID 1 is received from customer side A should be delivered to the customer connected to side B. Although the port is not necessarily a member of the VLAN, in this case it can be chosen.

Another parameter of each port is the untagged set as shown in FIG. 4. For all VLAN IDs in this set for a given port, the frames belonging to this VLAN are sent out without a tag. No untagged means in that case that all frames that are sent out are tagged, i.e. the untagged set is empty. So there are no untagged frames being sent. And for all customer LAN ports, i.e., on the port-connected to customer, there is provided untagged 1, 2, and 3. It means that for all frames belonging to VLAN ID 1, 2, and 3 that are sent out towards a customer the tag is removed. Otherwise, customers would receive tagged frames even though they were sent out untagged.

For each port (customer and network), the configuration of the parameters are identified as follows:

An IEEE 802.1Q compliant bridge supports the following configuration parameters:

VLAN membership set per VLAN: For each VLAN, the bridge maintains a set of ports that are a member of that VLAN, i.e. they are allowed to send out and receive frames belonging to that VLAN.

Untagged set per VLAN: For each VLAN, the bridge maintains a set of ports, on which frames belonging to that VLAN are to be sent without a VLAN tag.

Ingress filtering: Per port, the bridge can activate ingress filtering. If ingress filtering is activated, frames received on that port belonging to a VLAN that does not include this port in its membership set, are dropped.

Port VLAN ID: If frames are received untagged or priority tagged (VLAN ID=0) on a port, they are classified into the VLAN identified by this PVID.

Shared learning: Normally address learning is per VLAN. A MAC address learned for one VLAN, is not learned for another VLAN. However, by enabling shared learning for a set of VLANs, a MAC address learned for one VLAN from that set is learned for all VLANs from that set.

For each customer port 404$_{A1,\,B1}$ and $_{C1}$, a PVID is set. This is the default VLAN ID to which untagged frames are assigned.

In current use of bridged networks for providing Ethernet services, the PVID is the same for all customer ports belonging to the same Service Instance. However, in accordance with embodiments of the present invention, the PVID is different for all customer ports. There is one exception. If two customer ports share the same bridge, the PVID can be the same.

All network ports for this Service Instance should be a member of this PVID at a bridge. The customer port is a member of this PVID as well. This ensures that frames received at a customer port can be transmitted to all other bridges that have a customer port for the same Service Instance. Furthermore, all customer ports of this Service Instance should be a member of the PVIDs configured at the other customer ports of the same Service Instance.

This ensures frames received at one customer port, can be sent out on any other customer port, as they share their VLAN membership. However, network ports are not configured as a member of the PVID configured at another bridge but ingress filtering is disabled. This implies that a network port will receive frames for all VLANs, including the frames identified with the PVID configured at other bridges. But it is not allowed to send out frames with this PVID, via the network ports.

This enforces that frames tagged with the PVID of another node can only be forwarded from a network port to a customer port, belonging to the same Service Instance (as this customer port is a member of the VLAN identified by that PVID), and not between network ports as network ports are not a member of that VLAN. This is the behavior required for IETF VPLS. The following example will elucidate the aforementioned embodiments of the present invention.

EXAMPLE

Bridge 404$_A$ receives a frame with DA=400 and SA=300 at the customer port 406$_{A1}$.

Bridge 404$_A$ learns address 300, i.e. it associates it with the customer port, for VLAN 1, 2 and 3, because they share their address information (i.e., shared learning).

The frame is tagged with PVID=1.

Because Bridge 404$_A$ has not learned address 400 yet, it will flood the frame on all network ports.

Bridge 404$_B$ and 404$_C$ receive the frame on their network ports 404$_{B3}$ and 404$_{C2}$. Although these ports are not a member of PVID=1, the frame is not discarded, because ingress filtering is disabled.

Both 404$_B$ and 404$_C$ learn address 300 on the receiving network ports, for VLAN 1, 2 and 3.

Assuming both 404$_B$ and 404$_C$ have not learned address 400 yet, they will flood the frame on all ports that are a member of PVID=1. This is for both 404$_B$ and 404$_C$ only at the customer port.

Now bridge 404$_B$ receives a frame with DA=300 and SA=400 at its customer port.

Bridge 404$_B$ learns address 400 for VLAN 1, 2 and 3.

The frame is tagged with PVID=2.

Because 404$_B$ has learned address 300 on one of the network ports (towards bridge 404$_A$), the frame is only forwarded via that port.

The configuration above requires a shared learning of the information of PVIDs used at a node with the other nodes. Each PVID can be used only once.

Figure 5:
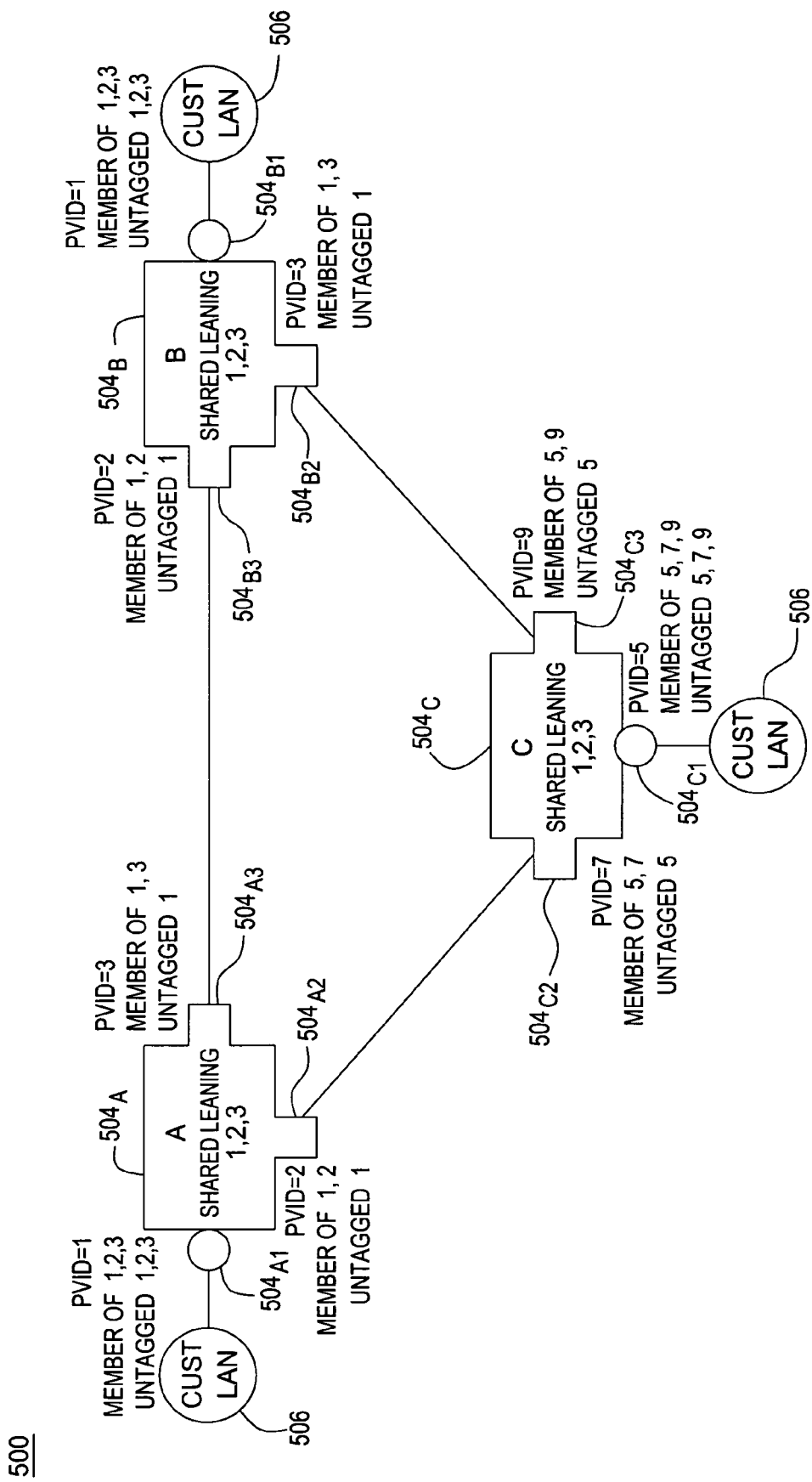
FIG. 5 depicts a schematic diagram of a bridged network architecture configured to support an IETF VPLS method for implementing Ethernet services in accordance with another embodiment of the present invention.

In FIG. 5, a network architecture 500 depicts how to configure the IEEE 802.1 Ethernet bridges to support an IETF VPLS method for implementing Ethernet services in accordance with another embodiment of the present invention. FIG. 5 shows three edge bridges $504_A$, $504_B$ and $504_C$. A customer may desire a LAN service interconnecting its customer LANs 506 to these provider edge bridges 504. For each bridge, there are two types of ports: network ports (e.g., $504_{A2, B2, C2}$ and $504_{A3, B3, C3}$) and customer ports (e.g., $504_{A1, B1, C1}$). Customer ports are connected to the customer LANs 506. Network ports are connected to other bridges in the network. This configuration 500 makes the assignment of PVIDs a local matter.

The difference between this and the previous configuration 400 is that in this configuration 500, frames are always sent untagged at the network ports. This implies that a network port can only support a single Service Instance. The advantage here is that the assignment of PVIDs at one node is independent of PVIDs at other nodes. As shown in FIG. 5 both bridge $504_A$ and $504_B$ use the same PVIDs at the customer node, but $504_C$ uses a different set.

The advantage of this configuration (FIG. 5) verses the previous embodiment is, for the previous embodiment, every edge node needs to know the PVID use of the other edge node. So if the system changes another edge node, it changes something in all the other edge nodes as well in the configuration. This may be an error prone activity. This is resolved in the solution shown in FIG. 5.

In the previous solution, frames are tagged at ingress when received from the customer and then they are forwarded with a tag to the other nodes. In this embodiment, the frames being sent on the network link are untagged. That means that each network link on a network can be used by only one customer. FIG. 5 shows one customer. But if the network duplicates all those customer links, say with another customer that might be in one office and the other may be in another one, it is undesirable to mix traffic from the two right. So in the previous embodiment, this will be resolved by using different VLAN IDs for those different customers.

But then this embodiment as on the links between the nodes, the frames are sent untagged and the system can only use the link for one customer because otherwise as soon as it removes the tag, the system can no longer distinguish between frames for one customer and for the other.

In this case, it brings up a problem and needs a different link for the customer. For example, if the link below this is SONET or a SDH, or MPLS, these networks provide different links towards the Ethernet layer. So when the frames are sent untagged from A to B and from A to C and then, on received, the nodes C and D assigned again a VLAN ID to it. For node B, this is VLAN ID 2. VLAN ID 2 and for node C this is 7, for frames coming from A.

The other port that is in membership with this VLAN ID is port connected to the customer LAN. So again, there are just two ports sharing that VLAN membership so traffic goes from the network link to the customer port only; it does not go from one network link to the other network link because the PVID on both network links are different and they are not a member of the VLAN ID that is equal to the PVID of the other network links.

So, for example, from Node C on the left side of the network link PVID is 7 and, on the right the PVID is 9. But the left one is not a member of 9 and the right one is not a member of 7. Therefore, traffic is never forwarded from one to the other. However, the link connected to the customer is a member of both 7 and 9, so traffic is always forwarded from the network link to the customer. So this again achieves the property that the edge node never forwards traffic from one network link to another network link, but always between network links and customer links.

The way a bridge operates is every Ethernet frame has a source and destination address associated with it. For forwarding a frame, only on the port by which the destination address and it will forward the frame only on the port for which this destination address is reachable. However, in the beginning it does not know where this destination address is reachable, so it will simply forward the frame to all ports of the VLAN frame to which it belongs.

If it receives a frame then it learns that the source address of that frame is reachable via port the frame. This information can then be used if the frame that is received should be delivered to that source address. For example, if there is a port on a bridge and the received frame destination is listed, as A and the source is B, the bridge learns that on that port, via that port, the source address is reached also. Address B is reachable via that port. At some point later, on another port the frame is received a destination address set of B, the patch knows that it should forward it to the port from which it just learned.

Normally, learning is done per VLAN because each VLAN belongs to a different customer. Different customers may use the same address, and the system does not want to mix learned information from one customer with learned information from the other. However, in this particular way of usage of VLANs, for the one customer, different VLAN IDs use different points in the network, but they all belong to the same customer. So, if a user cared to share the information about the MAC addresses between those VLANs, so that for one VLAN, the user can also apply it to two. This property is called shared learning, which means that one shares the learning information between the VLANs. This is so because, in general, the customer may have more than one VLAN. The way the term VLAN is used is that for the same customer in the direction from A to B, use VLAN ID 1, but in the opposite direction, use VLAN ID 2. But it is the same customer and the same traffic so the user wants to share this information between the two VLANs.

The PVID provisions on the different ports for this new customer might be different.

In an alternative embodiment, the bridges shown in FIGS. 4 and 5 may actually consist of a bridged LAN itself, as long as the edges of that bridged LAN are configured as shown.

Thus, embodiments of the present invention allow the offering of an IETF VPLS-like solution using IEEE 802.1 compliant hardware. The embodiments specify a non-standard setting of configurable parameters of a standard IEEE 802.1 bridge. These parameters are normally visible in bridges (to the network administrator). The settings may be generated by a management system or by a human manager. In the latter case the procedure should be described in a manual.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for implementing Ethernet service, the method comprising:

configuring a bridged network to support virtual private local area network (LAN) services (VPLS), the bridged network comprising a plurality of bridging network elements coupled by links, wherein:

each of the plurality of bridging network elements comprises a respective plurality of ports, the plurality of ports comprising at least one customer port and at least one network port; and the configuring, for each of the plurality of bridging network elements, comprises:

assigning to each of the at least one customer port of the bridging network element a respective port virtual LAN identifier (PVID), the bridging network element configured to assign the PVID to data frames entering the bridged network through the customer port, wherein:

when the at least one customer port comprises only one customer port, then the respective PVID assigned to the only one customer port differs from PVIDs assigned to all other customer ports of the plurality of bridging network elements; and assigning to each of the at least one network port and the at least one customer port of the bridging network element a respective PVJD membership group comprising one or more PVIDs, wherein the bridging network element is configured to prevent each of the at least one network port from forwarding a frame having a PVID that differs from each PVID in the PVID membership group to other network ports.

2. The method of claim 1, wherein:

when the at least one customer port of at least one of the plurality of network bridging elements comprises a plurality of customer ports then the respective PVIDs assigned to the plurality of customer ports are the same and differ from a PVID assigned to all other customer ports of all others of the plurality of bridging network elements.

3. The method of claim 1, wherein:

ingress filtering is disabled at each of the at least one network port for each of the plurality of bridging network elements such that the network port is adapted to receive frames having a PVID that differs from each PVID in the PVID membership group assigned to the network port.

4. The method of claim 1, wherein, for each of the plurality of bridging network elements, at least one PVID is common to all PVID membership groups assigned to all network and customer ports of the bridging network element.

5. The method of claim 1, wherein each of one or more PVIDs included in respective one or more PVID membership groups assigned to all network ports of one of the plurality of bridging network elements differs from any other PVID included in PVID membership groups assigned to all network ports of all others of the plurality of bridging network elements.

6. The method of claim 1, wherein each of the plurality of bridging network elements is configured to forward frames from a network port of the bridging network element to a respective other network port of another of the plurality of bridging network elements.

7. The method of claim 1, wherein each of the links coupling the plurality of bridging network elements comprises one of MPLS, SDH, and Ethernet.

* * * * *